US010594943B2

United States Patent
Sakano et al.

(10) Patent No.: US 10,594,943 B2
(45) Date of Patent: Mar. 17, 2020

(54) CAMERA CALIBRATION DEVICE AND CAMERA CALIBRATION SYSTEM

(71) Applicant: Clarion Co., Ltd., Saitama-shi, Saitama (JP)

(72) Inventors: Morihiko Sakano, Tokyo (JP); Keiji Sato, Saitama (JP)

(73) Assignee: CLARION CO., LTD., Saitama-Shi (JP)

( * ) Notice: Subject to any disclaimer, the term of this patent is extended or adjusted under 35 U.S.C. 154(b) by 106 days.

(21) Appl. No.: 15/306,672

(22) PCT Filed: Sep. 29, 2015

(86) PCT No.: PCT/JP2015/077517
§ 371 (c)(1),
(2) Date: Oct. 25, 2016

(87) PCT Pub. No.: WO2016/052505
PCT Pub. Date: Apr. 7, 2016

(65) Prior Publication Data
US 2017/0061622 A1 Mar. 2, 2017

(30) Foreign Application Priority Data

Sep. 30, 2014 (JP) .................. 2014-201547

(51) Int. Cl.
*H04N 7/18* (2006.01)
*H04N 5/232* (2006.01)
(Continued)

(52) U.S. Cl.
CPC .......... *H04N 5/23296* (2013.01); *B60R 1/00* (2013.01); *G06K 9/00744* (2013.01);
(Continued)

(58) Field of Classification Search
CPC ............. G06T 7/80; G06T 2207/10016; G06T 2207/30204; G06T 2207/30252;
(Continued)

(56) References Cited

U.S. PATENT DOCUMENTS

2008/0181591 A1* 7/2008 Hongo ................... G03B 17/00
396/50
2012/0105642 A1* 5/2012 Nojiri ....................... B60R 1/00
348/148
(Continued)

FOREIGN PATENT DOCUMENTS

CN          10313674 A     6/2013
CN          103686143 A    3/2014
(Continued)

OTHER PUBLICATIONS

Extended European Search Report issued in corresponding application No. 15 84 5604 dated Feb. 22, 2018.
(Continued)

*Primary Examiner* — Masum Billah
(74) *Attorney, Agent, or Firm* — Foley & Lardner LLP

(57) ABSTRACT

The present invention provides a camera calibration device and a camera calibration system with which it is possible to execute calibration even in a situation where the load-bearing state of a vehicle changes, and also to precisely estimate all of camera parameters and execute calibration without utilizing the parallelism of the vehicle to, e.g., a white line. The orientation of a vehicle is estimated on the basis of a prescribed feature amount extracted from a video, the translation-direction position of a camera relative to ground is corrected on the basis of information obtained from the calibration executed at a time in the past such as the time of product shipment, and a camera parameter pertaining to the orientation of the camera relative to ground is calculated on the basis of the orientation of the vehicle and the (Continued)

translation-direction position of the camera relative to ground.

10 Claims, 11 Drawing Sheets

(51) Int. Cl.
*B60R 1/00* (2006.01)
*G06K 9/00* (2006.01)
*G06T 11/60* (2006.01)

(52) U.S. Cl.
CPC .............. *G06T 11/60* (2013.01); *H04N 7/181* (2013.01); *B60R 2300/105* (2013.01); *B60R 2300/60* (2013.01); *G06T 2207/10016* (2013.01); *G06T 2207/20221* (2013.01); *G06T 2207/30244* (2013.01); *G06T 2207/30252* (2013.01); *H04N 5/23238* (2013.01)

(58) Field of Classification Search
CPC ......... G06T 2207/30256; G06T 1/0007; G06T 2207/10004; G06T 2207/10012; G06T 2207/10048
USPC ........................................................ 348/148
See application file for complete search history.

(56) References Cited

U.S. PATENT DOCUMENTS

| 2013/0135474 | A1 | 5/2013 | Sakano et al. |
| 2014/0085469 | A1* | 3/2014 | Sakano ................ H04N 17/002 348/148 |
| 2015/0254853 | A1* | 9/2015 | Tanaka ..................... B60R 1/00 348/148 |

FOREIGN PATENT DOCUMENTS

| EP | 2 711 895 A2 | 3/2014 | |
| JP | 2013-115540 A | 6/2013 | |
| JP | 2014-074591 A | 4/2014 | |
| JP | 2014-074632 A | 4/2014 | |
| WO | WO-2012/145822 A1 | 11/2010 | |
| WO | WO 2012/139660 A1 | 10/2012 | |
| WO | WO 2012/143036 A1 | 10/2012 | |
| WO | WO 2012143036 A1 * | 10/2012 | ............... G06T 7/80 |
| WO | WO 2014/054223 A1 | 4/2014 | |

OTHER PUBLICATIONS

Chinese Office Action dated Sep. 4, 2018 in Chinese Application No. 201580020606.4.

* cited by examiner

CAMERA CALIBRATION DEVICE AND CAMERA CALIBRATION SYSTEM

TECHNICAL FIELD

The present invention relates to a camera calibration device and a camera calibration system.

BACKGROUND ART

Conventionally, an in-vehicle camera comes into use for the purpose of supporting a driver to confirm the surroundings. In addition, in recent years, a system is put into practical use in which videos captured by a plurality of cameras attached around the vehicle are transformed in viewpoint, and an overview video (a video viewed from right overhead) around the vehicle is generated by synthesizing the videos and presented to a driver.

As described above, in order to generate a synthesized video by transforming the videos captured by the cameras, camera-specific information (inner parameter) such as an optical characteristic (a focal distance and a lens distortion) and a size of an image pickup device, and information (external parameter) on an attached position and an angle of each camera are required. The videos captured by the cameras are transformed in overview using camera parameters obtained by synthesizing the inner parameter and the external parameter as described above. A video captured from the overview point can be virtually generated by synthesizing the overview videos obtained from the videos.

By the way, the cameras are attached to the vehicle at positions and with angles in conformity to design values. At that time, there occurs an error inevitably. In a case where the overview video is generated on the basis of the design values regardless of such an error, the overview video captured from the overview point is necessarily not an expected one, and a deviation occurs in the video by an amount of the error. In particular, in a case where a plurality of videos are synthesized, an influence of the deviation remarkably appears in a boundary area of images of the cameras in the synthesized image, which is greater on appearance than a case where a single camera is used. In order to solve such a problem, a correction (called calibration) of the error caused from the design value of the camera parameter is performed.

Since the error is necessarily corrected with an extremely high accuracy in the calibration, a method of estimating a current installation state of the camera from the captured video is employed in place of a method of mechanically adjusting the installation state thereof. As a typical method of estimating the installation state from the captured video, there is typically employed a method of accurately providing a pattern (a calibration chart) printed in a sheet or a plate at a predetermined position, and correcting the camera parameter such that the actually captured video is matched to a video captured by a camera which is manufactured and provided in conformity to the design value. At that time, the attachment state of the camera is not adjusted, but numerical values in a program related to the attachment position and the angle of the camera are corrected through an image transformation.

By the way, when the calibration is performed in a production line of a factory at the time of vehicle shipment, the calibration is executed by simulating an empty condition of no one passenger or a specific loading state such as a case where a driver sits in a driver seat. Therefore, the deviation is not generated in the video in the same state as the actual calibration such as the empty state or the specific loading state.

However, when the user actually uses the vehicle, the states such as the number of riding persons, a seating place, and a loading state of a baggage are variously changed. Then, when the loading state of the vehicle is changed, the posture of the vehicle is also changed, and accordingly the installation state of the camera with respect to the ground surface is also changed. In other words, an error is generated since the camera parameter varies. Therefore, the deviation is generated in the video by the error of the camera parameter.

With regard to such a problem, PTLs 1 and 2 disclose technologies of correcting the camera parameter in running of the vehicle.

An online calibration method of a vehicle camera disclosed in PTL 1 is a method in which an adjacent portion of a road is captured by at least two cameras, a road characteristic in a longitudinal direction is specified in an image frame, a road characteristic in the longitudinal direction specified in at least two image frames captured by two camera is selected such that two image frames are matched by a single line therebetween, a matching rate of the single line is analyzed to determine an offset of the line between two image frames, and the offset of the determined line is applied for the calibration of the camera.

In addition, an online calibration method of a vehicle camera disclosed in PTL 2 is a method in which a part of a road is captured by the camera, a road characteristic in the longitudinal direction is specified in an image frame, a point along the specified road characteristic in the longitudinal direction is extracted and the extracted point is transformed into a virtual road plane by a perspective mapping in consideration of a given camera parameter, the extracted point thus transformed is analyzed with respect to the vehicle to determine a deviation from a line in parallel to the vehicle of the point, and the measured deviation is used to define an offset correction of the camera.

CITATION LIST

Patent Literature

PTL 1: WO 2012/143036 A
PTL 2: WO 2012/139660 A

SUMMARY OF INVENTION

Technical Problem

However, the inventors have analyzed and confirmed that it is not possible to exactly estimate a specific external parameter since the calibration is realized only using the feature quantity in the longitudinal direction in the online calibration method of the vehicle camera disclosed in PTL 1.

In addition, since the calibration is realized using the parallelism of the vehicle with respect to a white line in the online calibration method of the vehicle camera disclosed in PTL 2, there is a problem in that the calibration can be executed only in a case where the vehicle is in parallel to the white line. In addition, the calibration is executed only in a case where the vehicle runs at a certain speed (50 km) or more in order to secure the parallelism of the vehicle with respect to the white line. For example, in a case where the vehicle runs at a low speed in a street, there is also a problem in that the calibration is not possible to execute.

The invention has been made in view of the problems, and an object thereof is to provide a camera calibration device and a camera calibration system which can execute the calibration even under a situation that the loading state of the vehicle changes, and can execute the calibration by accurately estimating all the camera parameters without using the parallelism of the vehicle with respect to the white line for example.

Solution to Problem

In order to solve the problems, a camera calibration device according to the present invention is a camera calibration device that is mounted in a vehicle and executes calibration on a plurality of cameras capturing an ambient environment of the vehicle, including: a video acquisition unit that acquires a video captured by the camera; a feature extraction unit that extracts a predetermined feature quantity from the video; a posture estimation unit that estimates a posture of the vehicle on the basis of the predetermined feature quantity; a translation correction unit that corrects a position in a translation direction of the camera with respect to a ground surface on the basis of information obtained from the calibration executed in the past; and a camera parameter calculation unit that calculates a camera parameter related to a posture of the camera with respect to the ground surface on the basis of the posture of the vehicle and a position of the camera in the translation direction with respect to the ground surface.

In addition, a camera calibration system acoustic to the present invention includes: the camera calibration device; the plurality of cameras that are mounted in the vehicle such that the captured videos are partially overlapped or adjacent; a synthesized video generation device that corrects the videos captured by the plurality of cameras using camera parameters of the cameras obtained from the camera calibration device so as to generate a synthesized video; and a display device that displays the synthesized video.

Advantageous Effects of Invention

According to the invention, the calibration can be executed even under a situation that the loading state of the vehicle changes, and can be executed by accurately estimating all the camera parameters without using the parallelism of the vehicle with respect to the white line for example. Therefore, it is possible to generate an overview video with high accuracy according to a loading state of the vehicle under any situation.

The other objects, configurations, and effects can be apparently known through the explanation of the following embodiments.

DESCRIPTION OF EMBODIMENTS

Hereinafter, embodiments of a camera calibration device and a camera calibration system according to the invention will be described with reference to the drawings. Further, the description in the following will be made about a case where four cameras are used and videos captured by adjacent two cameras are partially overlapped or adjacent. However, the number of cameras in the system or the number of cameras capturing the overlapped or adjacent portion may be appropriately changed according to a user's request.

Embodiments of Camera Calibration System

Figure 1:
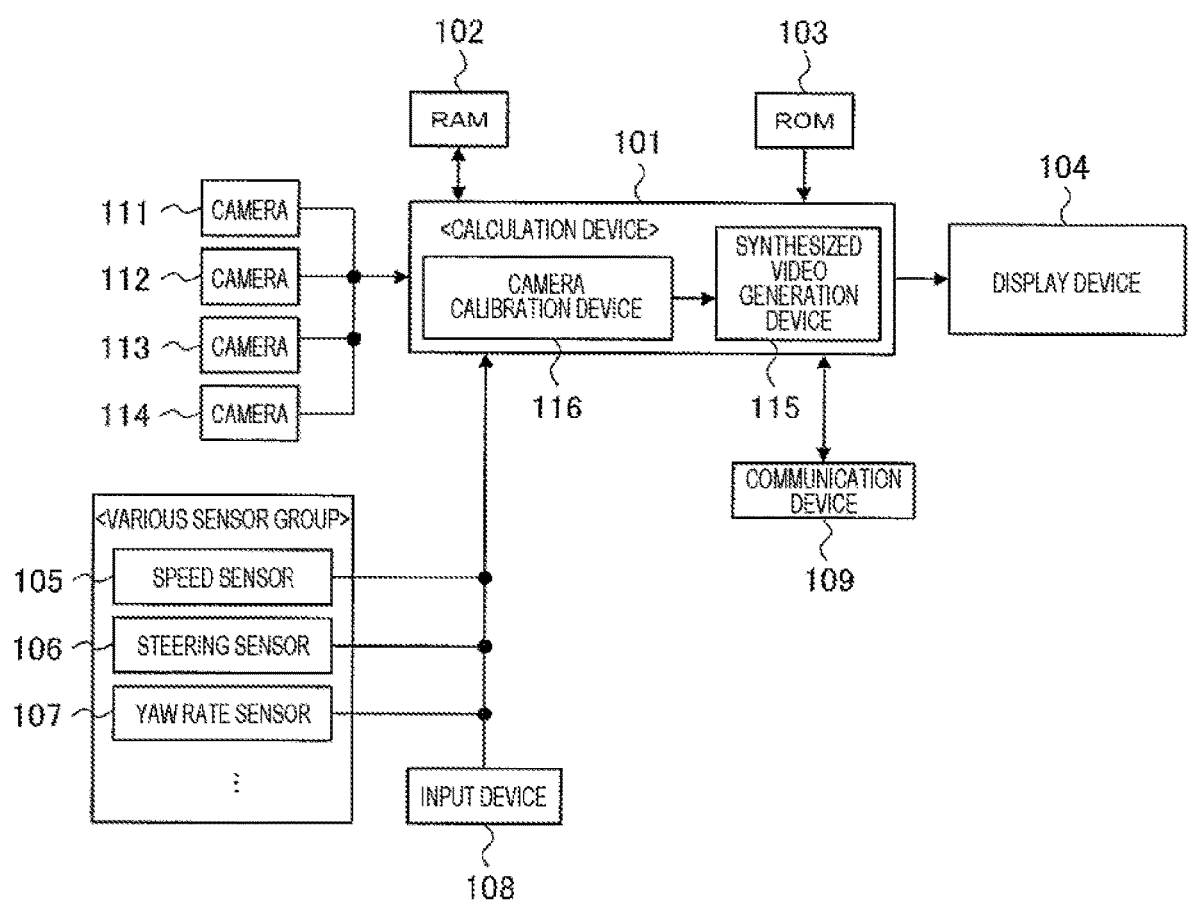
FIG. 1 is a diagram illustrating the entire configuration of a camera calibration system according to an embodiment of the invention.

FIG. 1 illustrates a system configuration for realizing an embodiment of a camera calibration system according to the invention. A camera calibration system 100 in the drawing mainly includes four cameras 111 to 114, a calculation device 101, a RAM 102, a ROM 103, a display device 104, a speed sensor 105, a steering sensor 106, a yaw rate sensor 107, an input device 108, and a communication device 109.

The cameras 111 to 114 are mounted in a vehicle 1, and provided on front, rear, right, and left sides of the vehicle 1 for example. For example, the cameras provided on the front and rear sides are attached to a vehicle body in the vicinity of a number plate, and the cameras provided on the right and left sides are attached to lower portions of side mirrors. Herein, the camera 111 is attached on the front side of the vehicle 1, the camera 112 on the rear side of the vehicle 1, the camera 113 on the left side of the vehicle 1, and the camera 114 on the right side of the vehicle 1 (see FIG. 3). The cameras 111 to 114 are attached such that an optical axis faces from a horizontal direction to a perpendicular direction with respect to a horizontal plane parallel to the ground. The cameras 111 to 114 are attached in accordance with known design information which is set in advance. However, actually there is an error in attachment, and such an error is unknown. In addition, a fish eye camera having a wide angle is employed as each of the cameras 111 to 114 to acquire the video all around the vehicle 1. Since the fish eye camera acquires a wide-angle video, the image is distorted on the basis of a known distortion function. The four videos captured by the cameras 111 to 114 are transmitted to the calculation device 101.

The speed sensor 105, the steering sensor 106, and the yaw rate sensor 107 are sensors for measuring speed, steering, and yaw rate. Sensor information measured by each sensor is transmitted to the calculation device 101, and used in a calculation process of the calculation device 101.

The input device 108 is a device such as a switch and a button which receives a user's operation, and is used in turning on/off a calibration function, initializing a calibration result, and changing a calibration method. Various types of information input to the input device 108 through a user's operation are transmitted to the calculation device 101.

The communication device 109 is a device which is used in communication with an external machine (not illustrated). The calculation device 101 receives various types of information from the external machine through the communication device 109, and transmits various types of information calculated by the calculation device 101 to the external machine.

Numerical data required in the calculation process of the calculation device 101, and a variable of a program with respect to a processing result obtained in the middle of the calculation process are written in the RAM 102. In addition, the written data is appropriately read as needed in the calculation process of the calculation device 101 to be used in the calculation process. In addition, video data captured by the cameras 111 to 114 is also stored in the RAM 102.

In the ROM 103, for example, a program for performing the calibration, and information to be used without being rewritten among the information required in the program are stored in advance. For example, camera parameters such as a design value of an installation position and an angle of each camera (external parameter), a focal distance of each camera, a pixel size, a center of the optical axis, and the distortion function (inner parameters) are stored.

The calculation device 101 is a device which receives various types of information transmitted from the cameras 111 to 114, the speed sensor 105, the steering sensor 106, the yaw rate sensor 107, the input device 108, and the communication device 109, and executes the calculation process on the basis of a program. For example, the calculation device 101 executes a calculation process in which the videos input from the cameras 111 to 114 are transformed in viewpoint and synthesized to generate a video (overview video) viewed from the above. In detail, the distortion of the videos captured by the fish eye cameras 111 to 114 is removed using the known distortion function which is stored in advance in the ROM 103. The videos obtained by removing the distortion are transformed in viewpoint and synthesized to obtain a video viewed from an overview point on the basis of the known design value related to the camera attachment which is stored in advance in the ROM 103 (a synthesized video generation device 115). Such a viewpoint transformation/synthesis process may be realized by calculating a specific image of the overview video and specific images of the cameras 111 to 114 corresponding thereto using a well-known geometric transformation formula of the camera, and by assigning a luminance value of the image to the pixel of the overview video. In a case where the corresponding pixel includes a decimal point and there is no subject pixel, there is performed a process of assigning an intermediate luminance value of the surrounding pixels through a well-known luminance interpolation processing. In addition, the calculation device 101 performs the calculation process using the output results of the speed sensor 105, the steering sensor 106, the yaw rate sensor 107, and the communication device 109, or a process of switching the operation programs according to the input result of the input device 108.

In addition, the calculation device 101 is embedded with a camera calibration device 116 which executes calibration (correction) of the camera such that the overview video generated by the overview transformation/synthesis process becomes a video of the vehicle 1 viewed from right overhead.

The display device 104 receives the process result of the calculation device 101, and presents the process result to the user using a display. For example, four videos of the cameras 111 to 114 are subjected to the viewpoint transformation/synthesis to generate the overview video, and displayed to a driver. In addition, the display device 104 can switch displaying contents according to the output of the calculation device 101 (for example, displaying only a video of the camera 112 which captures the rear side of the vehicle 1).

Figure 2:
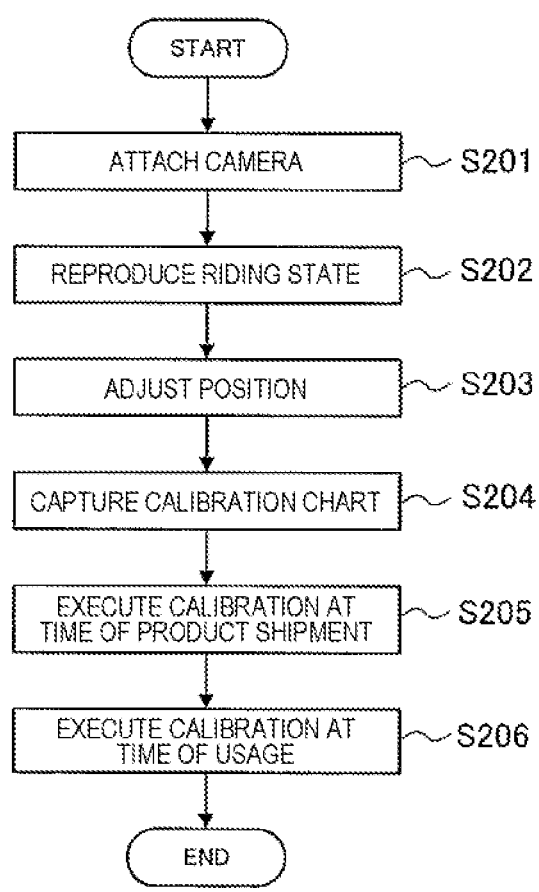
FIG. 2 is a flowchart for describing a procedure until calibration is executed at the time of product shipment and at the time of usage.

FIG. 2 is a flowchart for describing a procedure until the calibration is executed at the time of product shipment and at the time of usage. As illustrated in the drawing, calibration S205 at the time of product shipment is executed, for example, after a camera attachment S201, a riding state reproduction S202, a position adjustment S203, and a calibration chart capturing S204.

The cameras 111 to 114 are attached to the vehicle body in the camera attachment S201, and a state where a passenger rides in the vehicle 1 is reproduced in the riding state reproduction S202. For example, a driver whose weight is 60 kg actually rides in a driver seat, and a baggage corresponding to the weight is loaded in order to reproduce an actual riding state. The reason for executing the riding state reproduction S202 is because a posture of the vehicle 1 is changed by a riding state, and angles of the cameras 111 to 114 with respect to the ground surface vary as the posture changes. In a case where the angles and positions of the cameras 111 to 114 are different from those of designed attachment states, there causes a deviation in a boundary (hereinafter, referred to as an image boundary) between the videos captured by the cameras in the synthesized video. Therefore, there may be a need to execute the calibration in consideration of the varied angles, and thus the corresponding attachment state of the camera is reproduced by the riding state reproduction S202.

The vehicle 1 and the calibration chart are adjusted to satisfy a predetermined positional relation in the position adjustment S203. In a general calibration, the positional relation between the calibration chart and the cameras is determined to a defined positional relation, and then the calibration is executed.

The calibration chart is captured by the cameras 111 to 114 attached to the vehicle 1 in the calibration chart capturing S204.

Then, the calibration is executed using the videos captured by the cameras 111 to 114 in the calibration S205 at the time of product shipment. At that time, for example, the calibration is executed by a well-known technique. In other words, in a case where the cameras 111 to 114 are attached as designed and the calibration chart is provided at a defined position, a drawing position of the calibration chart is calculated, and the camera parameters used in image transformation in the program are adjusted such that the calibration chart is shown at the drawing position in the actually captured video. Regarding the calibration S205, for example, there may be used a well-known technique in which the calibration can be executed even when the positional relation between the calibration chart and the vehicle 1 is undefined. In this case, a procedure of the position adjustment S203 becomes unnecessary.

By the way, in a case where the calibration is executed in such a procedure, the calibration is executed on an assumption of a specific riding state as executed in the riding state reproduction S202. When the riding state is different from that at the time of calibration executed at the time of product shipment, there causes a deviation in a video boundary in the overview video. Therefore, it is not sufficient that the calibration is executed only in a specific riding state. For example, there is a need to execute the calibration at every time according to the riding state. Therefore, even at the time of usage including running and parking after the product shipment, the calibration in accordance with the riding state at that time is executed. In other words, as illustrated in FIG. 2, calibration S206 at the time of usage is executed after the calibration S205 at the time of product shipment is executed.

In the calibration S206 at the time of usage, in order to cope with the above problem, the camera calibration device 116 built in the calculation device 101 executes the calibration at every time according to the riding state using information of ambient environments which can be captured by the cameras 111 to 114 at the time of usage of the vehicle 1 such as running and parking. This embodiment is based on an assumption that the calibration is once executed in a factory, for example, by the procedure illustrated in FIG. 2. However, in this embodiment, the camera parameters with respect to all the cameras 111 to 114 can be estimated without requiring a parallelism of the vehicle with respect to a white line (that is, a relative relation between the white line and the vehicle). In general, since the calibration is executed at the time of factory shipment as well as quality verification of the video captured by the camera, it is considered that an obtainable merit is large even on an assumption that the calibration is once executed as a constrain condition.

Figure 4:
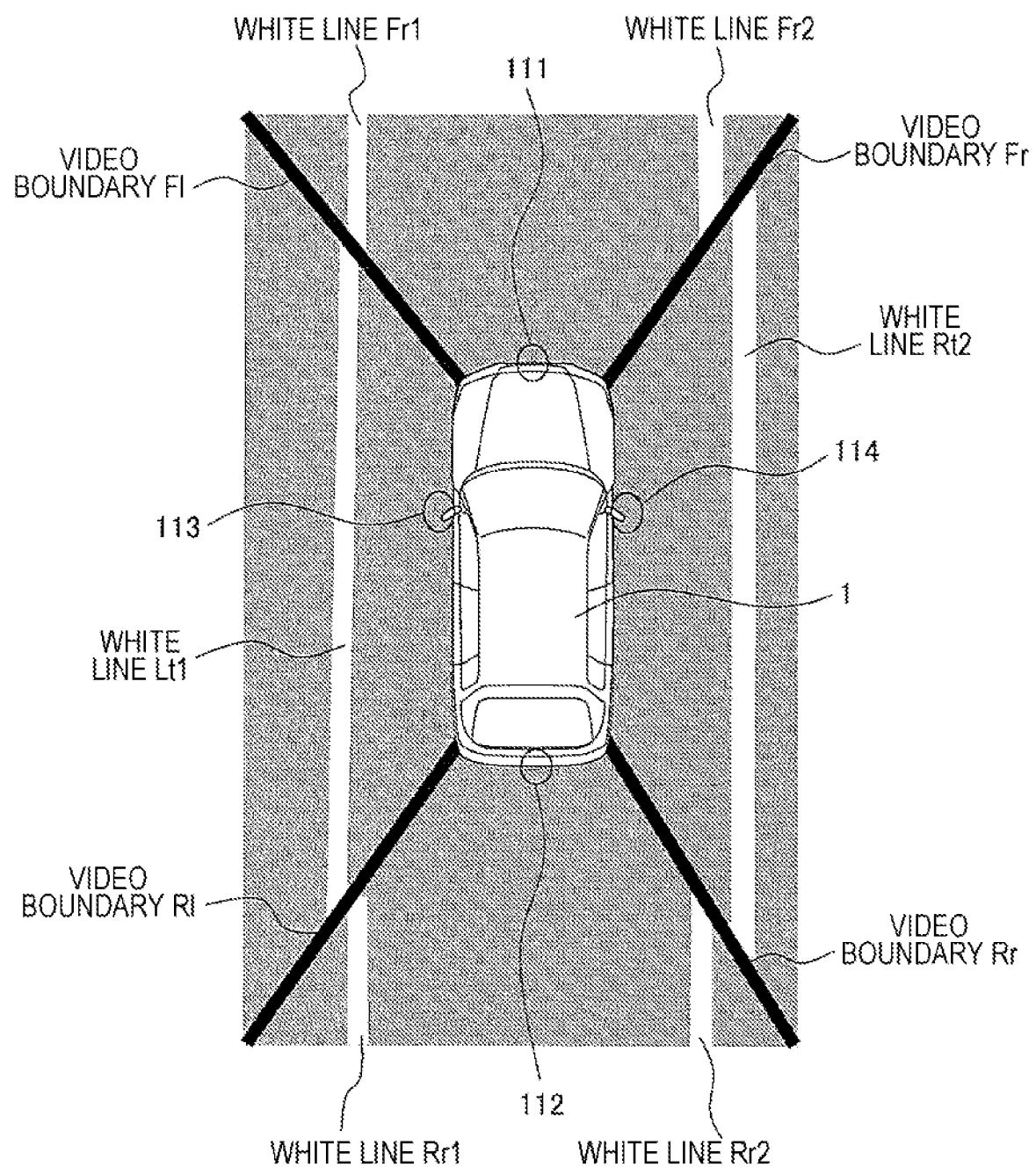
FIG. 4 is a diagram illustrating an example of the overview video in process of executing the calibration at the time of usage.
Figure 5:
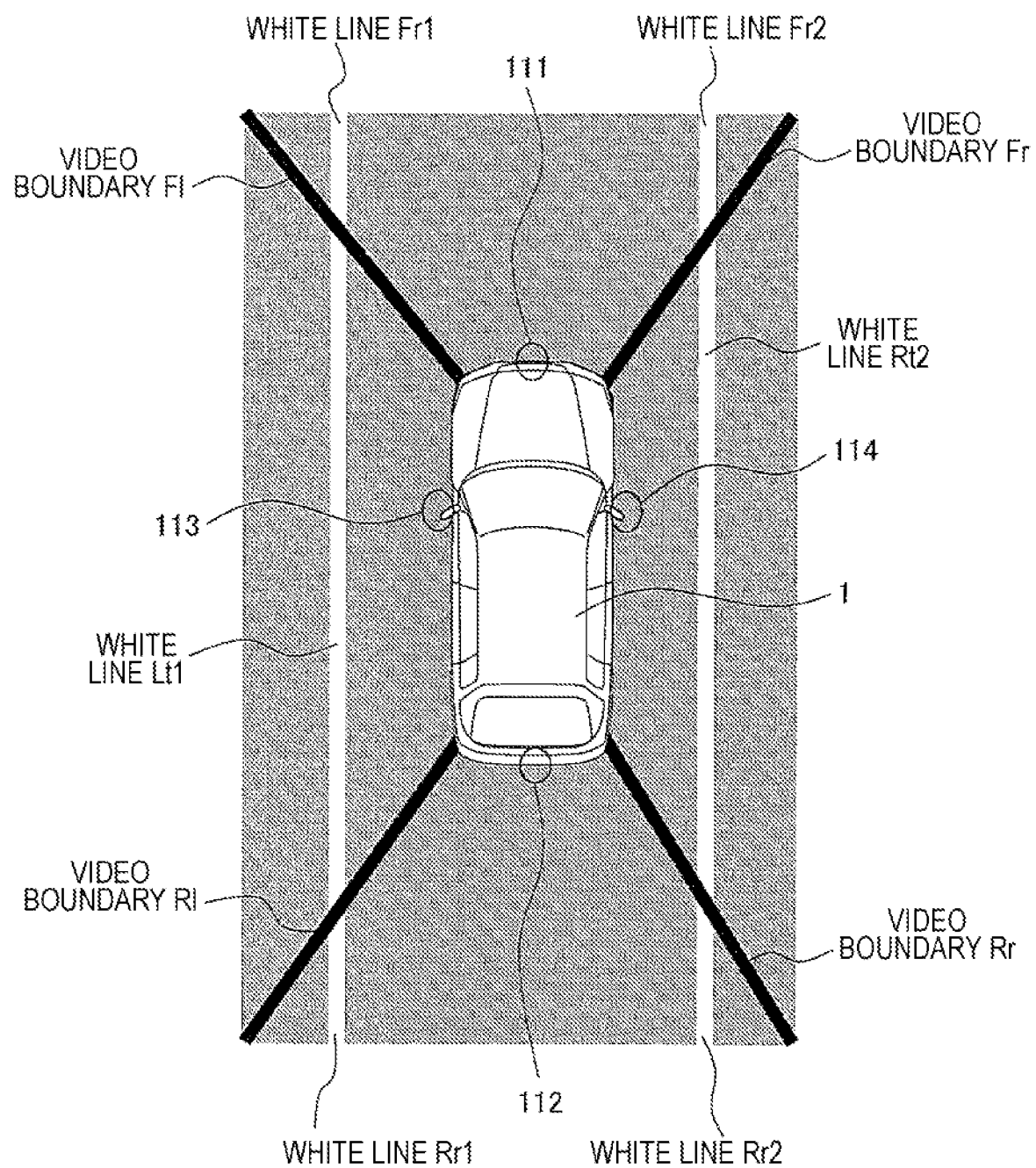
FIG. 5 is a diagram illustrating an example of the overview video after the calibration at the time of usage is executed.

The calibration S206 at the time of usage executed by the camera calibration device 116 will be described with reference to FIGS. 3 to 5.

Figure 3:
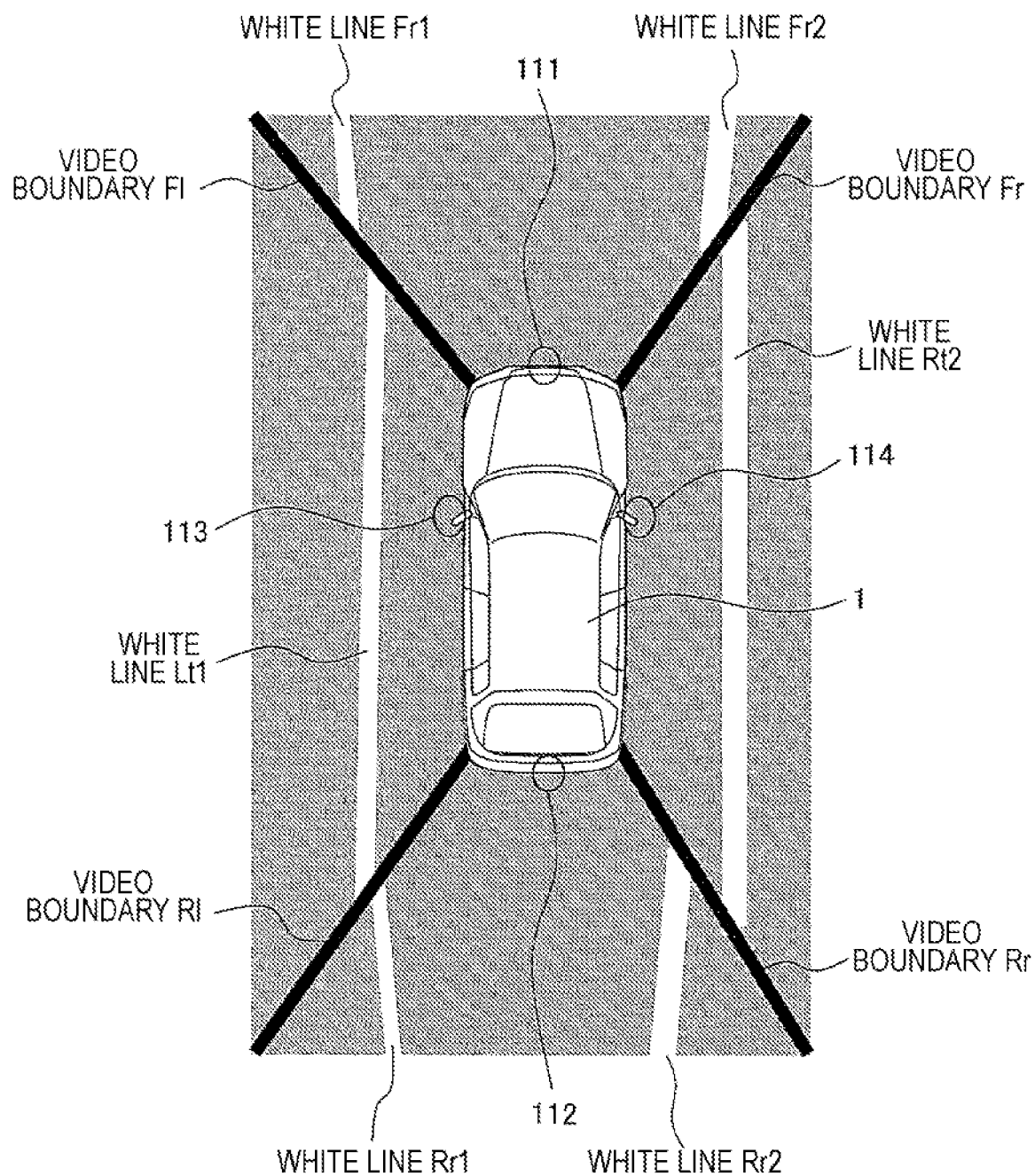
FIG. 3 is a diagram illustrating an example of an overview video before the calibration at the time of usage is executed.

FIG. 3 illustrates an example of the overview video before the calibration at the time of usage is executed, in which an example of the overview video is illustrated when a loading state of the vehicle at the time of usage is changed from the loading state assumed in the calibration at the time of product shipment after the calibration is executed at the time of product shipment in the factory through the processes of S201 to S205 of FIG. 2. As illustrated in FIG. 3, while the white line of a road is drawn in the overview video, the loading state of the vehicle 1 is different from that assumed in advance. Therefore, the postures (angles and positions) of the cameras 111 to 114 with respect to the ground surface are changed, and the white lines are deviated in the video boundaries of the cameras 111 to 114.

Therefore, the calibration at the time of usage is executed in such a situation such that the overview video is corrected to eliminate the deviation of the white line. In this embodiment, for example, the calibration is executed using the captured videos containing a linear feature quantity (feature quantity having linearity) in a longitudinal direction such as the white line in order to make the calibration executed in scenes as many as possible, and to make the calibration stable. At that time, as illustrated in FIG. 3, linear structures (the linear feature quantity, the white line in the drawing) are captured on both sides of the vehicle 1. At least, two linear structures are necessarily captured by the camera 111, two linear structures by the camera 112, one linear structure by the camera 113, and one linear structure by the camera 114. In addition, two linear structures captured by the cameras 111 and 112 are necessarily in parallel to each other. However, the relative relation between the vehicle 1 and the linear structure is not required such as a relative angle between the vehicle 1 and the linear structure and a distance up to the linear structure.

In more detail, in the calibration at the time of usage, the posture of the vehicle 1 (that is, the parameter indicating the posture of the vehicle 1) is estimated without directly estimating the parameter of the cameras 111 to 114. The camera parameters of the cameras 111 to 114 are estimated from the parameters indicating the posture of the vehicle 1 to execute the calibration. The step of estimating the posture of the vehicle 1 is divided into a step of estimating a pitch angle of the vehicle 1 and a step of estimating a roll angle and a height of the vehicle 1. In the step of estimating the pitch angle of the vehicle 1, the pitch angle of the vehicle 1 is estimated on the basis of the parallelism between parallel straight lines captured by the cameras 111 and 112 installed on the front and rear sides of the vehicle 1. When the pitch angle of the vehicle 1 is estimated to correct the camera parameter, an overview video as illustrated in FIG. 4 is obtained. Herein, the camera parameter is corrected such that the parallel straight lines captured by the cameras 111 and 112 are in parallel on the overview video. Thereafter, in the step of simultaneously estimating the roll angle and the height of the vehicle 1, the roll angle and the height of the vehicle 1 are estimated such that a deviation of the straight line in the video boundary of the overview video is eliminated. In this way, the roll angle and the height of the vehicle 1 are estimated to correct the camera parameter, and the camera parameters of all the cameras are estimated in accordance with a variation of the vehicle posture to execute the calibration. As a result of the calibration, the overview video having no deviation in the video boundary is obtained as illustrated in FIG. 5.

First Embodiment of Camera Calibration Device

Figure 6:
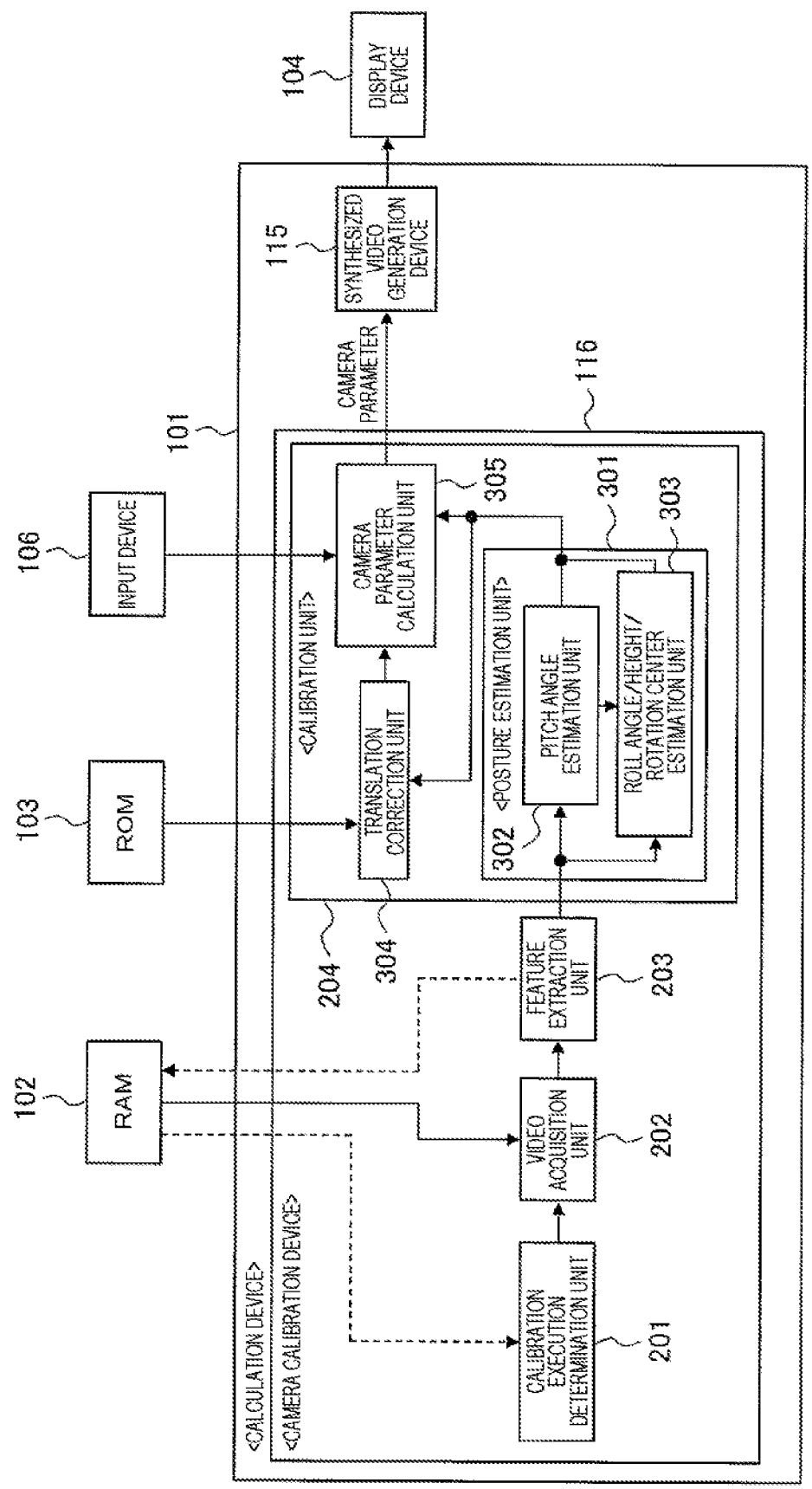
FIG. 6 is a diagram illustrating an example of an inner configuration of the camera calibration device illustrated in FIG. 1.
Figure 7:
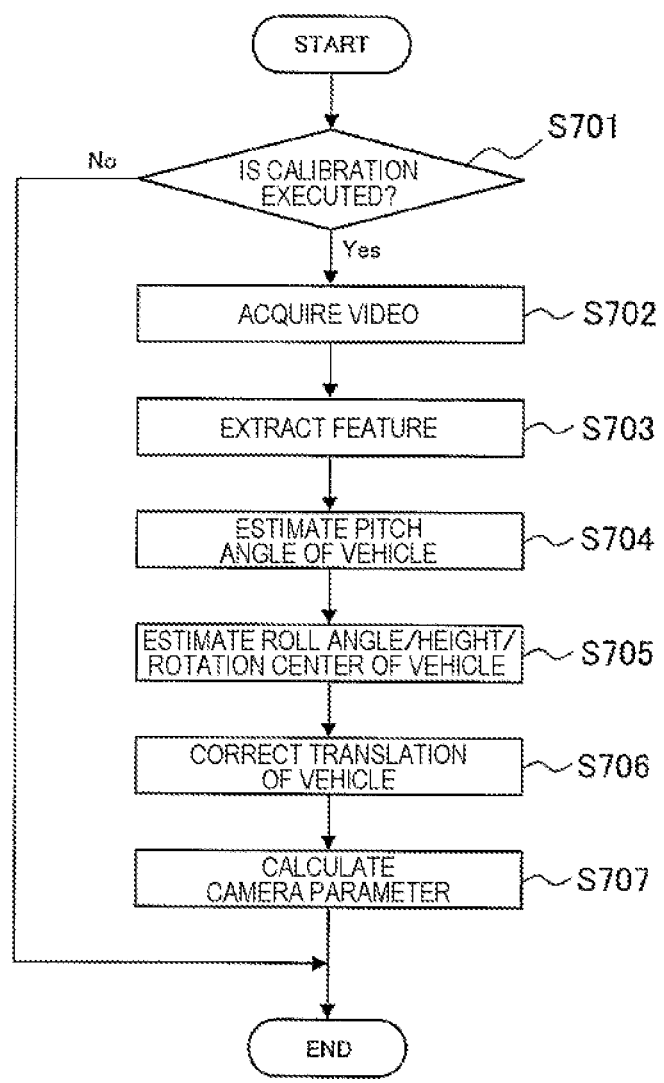
FIG. 7 is a flowchart for describing a calibration process of the camera calibration device illustrated in FIG. 6.

FIG. 6 is a diagram illustrating an example (first embodiment) of an inner configuration of the camera calibration device illustrated in FIG. 1, in which an inner configuration of the camera calibration device to realize the calibration at the time of usage is illustrated. In addition, FIG. 7 is a flowchart for describing a calibration process of the camera calibration device illustrated in FIG. 6. Further, the calibration process of the camera calibration device illustrated in FIG. 6 is executed by loading a program stored in advance in the ROM 103.

The camera calibration device 116 illustrated in FIG. 6 mainly includes a calibration execution determination unit 201, a video acquisition unit 202, a feature extraction unit 203, and a calibration unit 204.

The calibration execution determination unit 201 of the camera calibration device 116 determines whether the calibration is necessary for the camera (S701 of FIG. 7). For example, the scenes showing the white lines in all four videos of the overview video captured by the cameras 111 to 114 are determined whether there occurs a deviation in the white lines in the video boundaries of the overview video. It is automatically determined whether the calibration is necessary for the camera. Herein, for example, the white line from the video is recognized using a well-known technique, a position in the video is calculated, a deviation amount at a predetermined video boundary position is measured, and it is determined whether the deviation amount exceeds a predetermined threshold so as to determine whether there occurs the deviation in the white line. In addition, for example, there may be used a method of determining whether the calibration is necessary by detecting a change in the loading state of the vehicle using a sensor (a gyro sensor) which directly estimates a posture change of the vehicle. In addition, there may be used a method of determining whether the calibration of the camera is necessary using the linear feature quantity (for example, information on a white line, a curb stone, and a road end boundary including a broken line which are temporally stored in the RAM 102) extracted by the feature extraction unit 203 described below, and using the parallelism of the linear feature quantities in parallel to each other on both sides of (around) the vehicle in the video together with the deviation amount of the linear feature quantity in each video boundary in the overview video.

In a case where the calibration execution determination unit 201 determines that the calibration of the camera is necessary, the video acquisition unit 202 acquires the videos captured by four cameras 111 to 114 attached to the vehicle 1 from the RAM 102 (S702 of FIG. 7). Further, when there is a deviation in synchronization in the videos captured by the cameras 111 to 114, the deviation appears as an error in the calibration. Therefore, it is desirable that the videos captured by the cameras 111 to 114 be stored in the RAM 102 in a perfect synchronization, or a deviation time of the video can be acquired. Further, the video acquisition unit 202 may directly acquire the videos from the cameras 111 to 114.

The feature extraction unit 203 extracts a predetermined feature quantity to be used in the calibration, particularly the linear feature quantity (for example, a white line, a curb stone, and a road end boundary including a broken line) in the longitudinal direction (that is, a front and rear direction of the vehicle) in the videos captured by the cameras 111 to 114 acquired by the video acquisition unit 202 (S703 of FIG. 7). The linear feature quantity can be extracted by a method, for example, in which each of the cameras 111 to 114 generates a video with a distortion of the fish eye camera eliminated using the designed distortion function, a well-known edge extraction is executed in the video, and a well-known Hough transformation is used for an edge characteristic point.

The calibration unit 204 executes the calibration of the camera using the feature quantity obtained by the feature extraction unit 203. While it is assumed that the calibration process in the calibration unit 204 is executed once in a factory, the parallelism of the vehicle with respect to the feature quantity in the longitudinal direction (that is, a relative relation between the feature quantity in the longitudinal direction and the vehicle) is not necessary, but all the camera parameters can be estimated only by the feature quantity in the longitudinal direction. In the calibration process, the camera parameters in the cameras 111 to 114 are not directly estimated, but the posture of the vehicle 1 is estimated. All the camera parameters are estimated through the posture of the vehicle 1. Each camera is attached to a rigid vehicle body. Therefore, in a case where the posture of the vehicle body is changed, the angle and the position of each camera also vary in an interlocking manner. For example, when a passenger rides in a front seat of the vehicle 1 and the front side of the vehicle 1 goes down, the angle of the camera 111 attached on the front side of the vehicle 1 goes downward, and the camera 112 attached on the rear side of the vehicle 1 faces upward by the same angle. When a passenger rides in a right seat of the vehicle 1 and the right side of the vehicle 1 goes down, the camera 114 attached on the right side of the vehicle 1 faces downward, and the camera 113 attached on the left side of the vehicle 1 faces upward by the same angle. In addition, at that time, the camera 111 attached on the front side of the vehicle 1 and the camera 112 attached on the rear side of the vehicle 1 are slightly rotated to the right side with respect to an optical axis. In this way, the variation of each of the cameras 111 to 114 is interlocked with the variation of the posture of the vehicle body. In addition, the variations of these cameras 111 to 114 are uniquely determined according to the variation of the posture of the vehicle body. In order to estimate the camera parameter while taking the interlocking to the vehicle body of the cameras 111 to 114 into consideration as described above, the camera parameters of the cameras 111 to 114 are not individually estimated, but the posture of the vehicle 1 is estimated and the camera parameters are calculated from the estimated posture of the vehicle 1 in the calibration process of the calibration unit 204.

In more detail, in a case where the calibration is executed only using a straight line in the longitudinal direction in the video, and when the camera parameters are individually estimated by the cameras 111 to 114, there is a parameter which cannot be estimated. For example, in a case where the calibration is executed using the parallelism of the vehicle 1 and the straight line, the roll angle of the camera 111 attached on the front side of the vehicle 1 can be obtained when the correction is performed such that the white line in the video is aligned in the just vertical direction. In addition, when a plurality of straight lines are captured, these lines are in parallel to the vehicle 1 and the straight lines are also in parallel to each other, so that the pitch angle of the camera 111 attached on the front side of the vehicle 1 also can be estimated by performing the correction to satisfy the parallelism of the straight lines. However, even when a yaw angle of the camera 111 attached on the front side of the vehicle 1 varies, the parallelism of the straight lines and the angles of the straight lines in the video do not vary. Therefore, the yaw angle is not sufficient for the feature for the correction, and cannot be uniquely determined. For this reason, the camera parameter is not possible to estimate, and the overview video completely having no deviation cannot be generated.

With this regard, in a case where the calibration is executed through the posture estimation of the vehicle 1 in running or in use, all the camera parameters can be estimated only using the straight line in the longitudinal direction even in a case where there is no relative relation between the straight line in the longitudinal direction and the vehicle. Although some observable variation should appear in order to estimate a certain camera parameter, in a case where the parameter of the vehicle posture varies, an observable change appears in the straight line in the longitudinal direction. Specifically, in a case where the pitch angle of the vehicle 1 varies, the parallelism of the straight line in the longitudinal direction in the overview video is changed. In addition, in a case where the roll angle of the vehicle 1 varies, the deviation of the straight line in the longitudinal direction occurs in the video boundary of the overview video. In addition, in a case where the height of the vehicle 1 varies, the deviation of the straight line in the longitudinal direction (which is different from a case where the roll angle of the vehicle 1 is changed) occurs in the video boundary of the overview video. Therefore, the parameter of the vehicle posture can be estimated only by the straight line in the longitudinal direction in the video. When the vehicle posture is determined, the positions and the angles of the cameras 111 to 114 attached to the vehicle 1 can be calculated, so that all the camera parameters can be estimated only by the straight line in the longitudinal direction in the video.

However, in the calibration process, the calibration is necessarily executed in advance at the time of factory shipment. In a case where the calibration is completed at the time of factory shipment, there is no deviation in the overview video in the loading state which is assumed at the time of the calibration. The deviation in the overview video is caused by the change of the vehicle posture in accordance with the change of the loading state of the vehicle 1. Therefore, when the variation of the camera posture according to the variation of the vehicle posture is canceled, it is possible to make the overview video have no deviation as it was. Therefore, it is possible to generate an overview video having no deviation by estimating the vehicle posture and by calculating the angle and the position of the camera according to the variation. Conversely, in a case where the calibration is not executed, the overview video only returns to an uncalibrated state at the initial state and the deviation of the video is left as it is even when the angle and the position of the camera are corrected by a variation of the vehicle posture. Therefore, it is not possible to generate the overview video having no deviation. For this reason, the calibration is necessarily executed in the calibration process in advance.

Specifically, the calibration unit 204 includes a posture estimation unit 301, a translation correction unit 304, and a camera parameter calculation unit 305. The posture estimation unit 301 is configured by a pitch angle estimation unit 302 and a roll angle/height/rotation center estimation unit 303.

The pitch angle estimation unit 302 of the posture estimation unit 301, for example, executes a pitch angle estimation of the vehicle 1 using the parallelism of the straight line (the linear feature quantity) in the longitudinal direction in the video captured by the cameras 111 and 112 attached on the front and rear sides of the vehicle 1 (S704 of FIG. 7). In a case where the white line drawn in the road or the parallel straight lines such as the white line and the road end boundary are captured in running, the parallel straight lines are displayed in parallel in an ideal overview video. However, in a case where there is a variation of the pitch angle of the vehicle 1, the parallel straight lines in the overview video are displayed in a "/\" shape which is not in parallel. In a case where the videos captured by the cameras 111 and 112 are transformed into the overview point, the pitch angle of the vehicle 1 is estimated such that the straight lines comes to be in parallel. Specifically, for example, an inner product of a linear vector is set to an evaluation function on the basis of the parallelism of a straight line equation in each of the cameras 111 and 112, and the pitch angle of the vehicle 1 is optimized such that the inner product in each of the cameras 111 and 112 approaches a value near "1" as close as possible. The straight line (linear feature quantity) used herein is obtained by the feature extraction unit 203 described above. Further, the above optimization may be realized using a well-known technique such as a steepest descent method. In other words, for example, a process may be repeatedly executed in which an evaluation function related to the pitch angle of the vehicle 1 is obtained and the pitch angle of the vehicle 1 is slightly changed for the evaluation function to approach a target value.

The roll angle/height/rotation center estimation unit 303 of the posture estimation unit 301 estimates the roll angle of the vehicle 1, the height of the vehicle 1, and the rotation center of the vehicle 1 to eliminate the deviation of the straight line (linear feature quantity) in the longitudinal direction appearing in the video boundary of the overview video (S705 of FIG. 7). Herein, the pitch angle of the vehicle 1 is fixed to a pitch angle obtained by the pitch angle estimation unit 302. Specifically, the evaluation function is designed to indicate the deviation of the straight line in the longitudinal direction appearing in the video boundary of the overview video, and the parameters related to the roll angle of the vehicle 1, the height of the vehicle 1, and the rotation center of the vehicle 1 are optimized to minimize the evaluation function. Herein, for example, the evaluation function is obtained by a total value obtained by calculating the deviation of the straight line in the video boundary of the overview video from the video boundary between the cameras 111 and 113, the video boundary between the cameras 111 and 114, the video boundary between the cameras 112 and 113, and the video boundary between the cameras 112 and 114. The straight line (linear feature quantity) used herein is obtained by the feature extraction unit 203 described above. Further, while the above optimization is executed using a well-known technique, there are a plurality of parameters to be estimated. Therefore, it is desirable to employ a global optimizing technique in place of a gradient method such as the steepest descent method. The process of slightly changing the roll angle of the vehicle 1, the height of the vehicle 1, and the rotation center of the vehicle 1 is repeatedly executed to minimize the evaluation function indicating the deviation of the straight line in the video boundary of the overview video. Further, a fact that the camera parameters may be different depending on the rotation center of the vehicle 1 is taken into consideration, and the optimization is executed including the rotation center of the vehicle 1.

The translation correction unit 304 corrects a parameter (translation parameter) corresponding to the translation (movement in a direction parallel to the ground surface) of the vehicle 1 with respect to the ground surface (that is, a position (position in plan view) in a translation direction except the height of the camera) on the basis of the information obtained from the past calibration (S706 of FIG. 7). Herein, the position of the camera with respect to the ground surface is not possible to estimate since information indicating an absolute distance between the ground surface and the camera is not measured. However, the deviation of the translation direction of the camera is extremely small in an actually obtainable variation range of the posture of the vehicle body. Therefore, for example, a value of the calibration executed at the time of product shipment which is stored in the ROM 103 is used. Since a relative position between the cameras is obtained by the roll angle/height/rotation center estimation unit 303, a camera as a reference (reference camera) is selected (for example, the camera 111), and all the positions of the cameras 111 to 114 are translationally corrected to cancel an error of the translation direction between the calibration value at the time of product shipment of the camera 111 and the current value.

The camera parameter calculation unit 305 calculates the camera parameters related to the postures of the cameras 111 and 114 corresponding to the posture of the vehicle 1 from the posture of the vehicle 1 obtained by the posture estimation unit 301 and the parameter obtained by the translation correction unit 304 (S707 of FIG. 7). Further, the camera parameters of the corresponding cameras 111 to 114 can be uniquely calculated by coordinate transformation.

With such a configuration, the camera parameters of all the cameras can be delicately estimated only by the feature quantity in the longitudinal direction without necessitating the parallelism of the vehicle with respect to the feature quantity in the longitudinal direction (that is, a relative relation between the feature quantity in the longitudinal direction and the vehicle). With the use of the camera parameter, it is possible to generate the overview video with high accuracy in accordance with the loading state of the vehicle.

Second Embodiment of Camera Calibration Device

By the way, when the calibration is executed at the time of usage as described above, the calibration is desirably executed in a state (normal running state) where the vehicle runs on a straight lane in order to extract the linear feature quantity in the longitudinal direction from the video for example.

Figure 8:
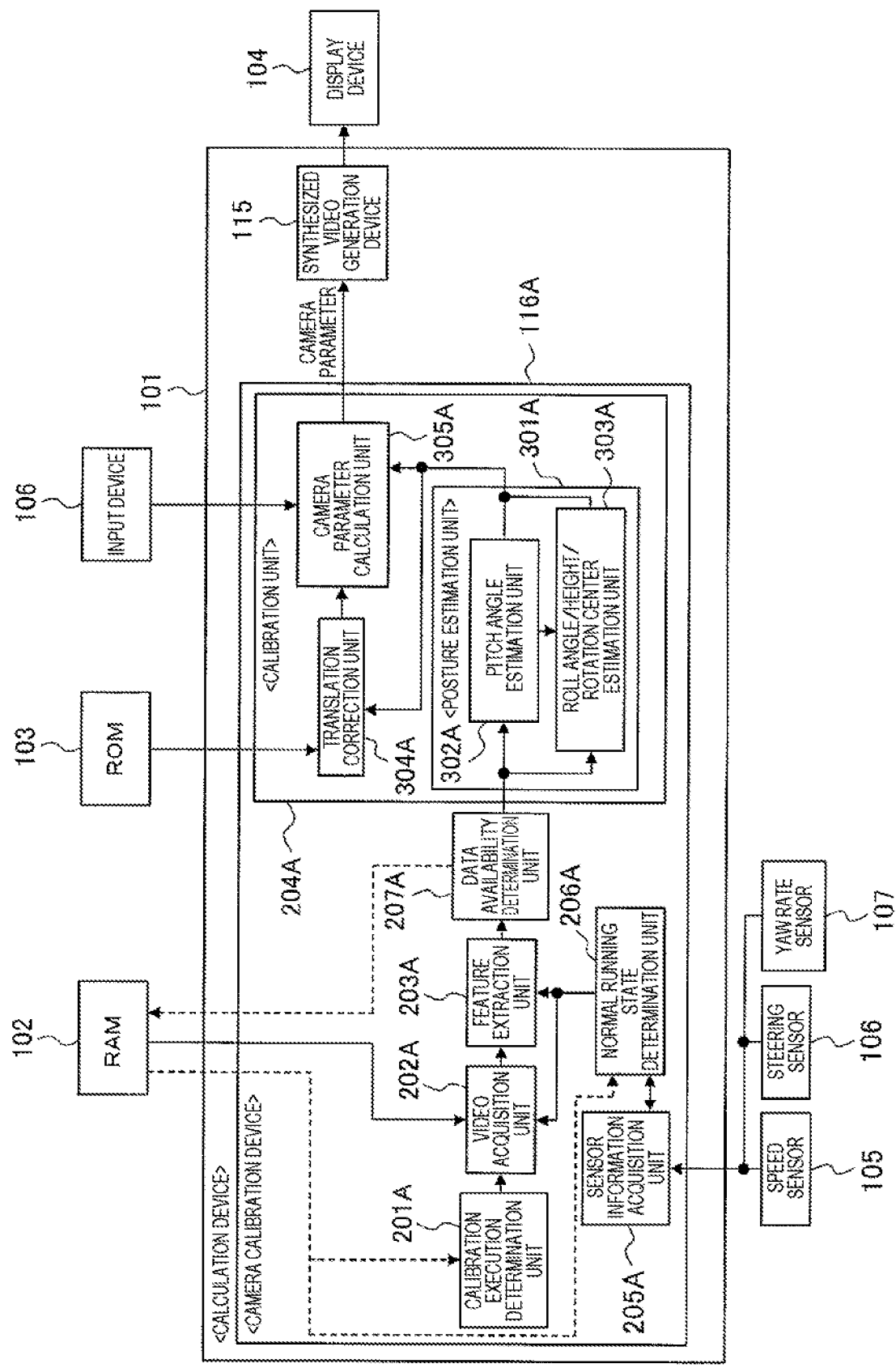
FIG. 8 is a diagram illustrating another example of the inner configuration of the camera calibration device illustrated in FIG. 1.
Figure 9:
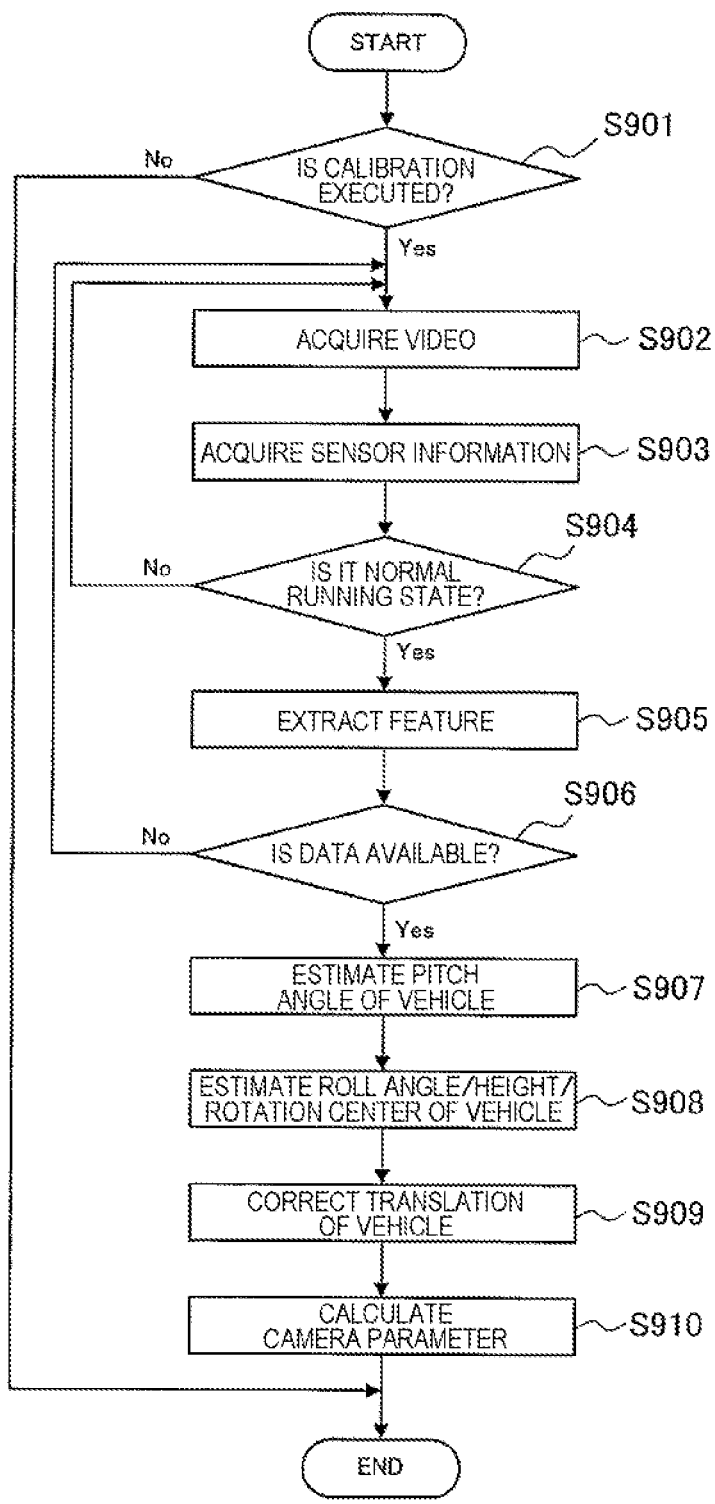
FIG. 9 is a flowchart for describing the calibration process of the camera calibration device illustrated in FIG. 8.
Figure 11:
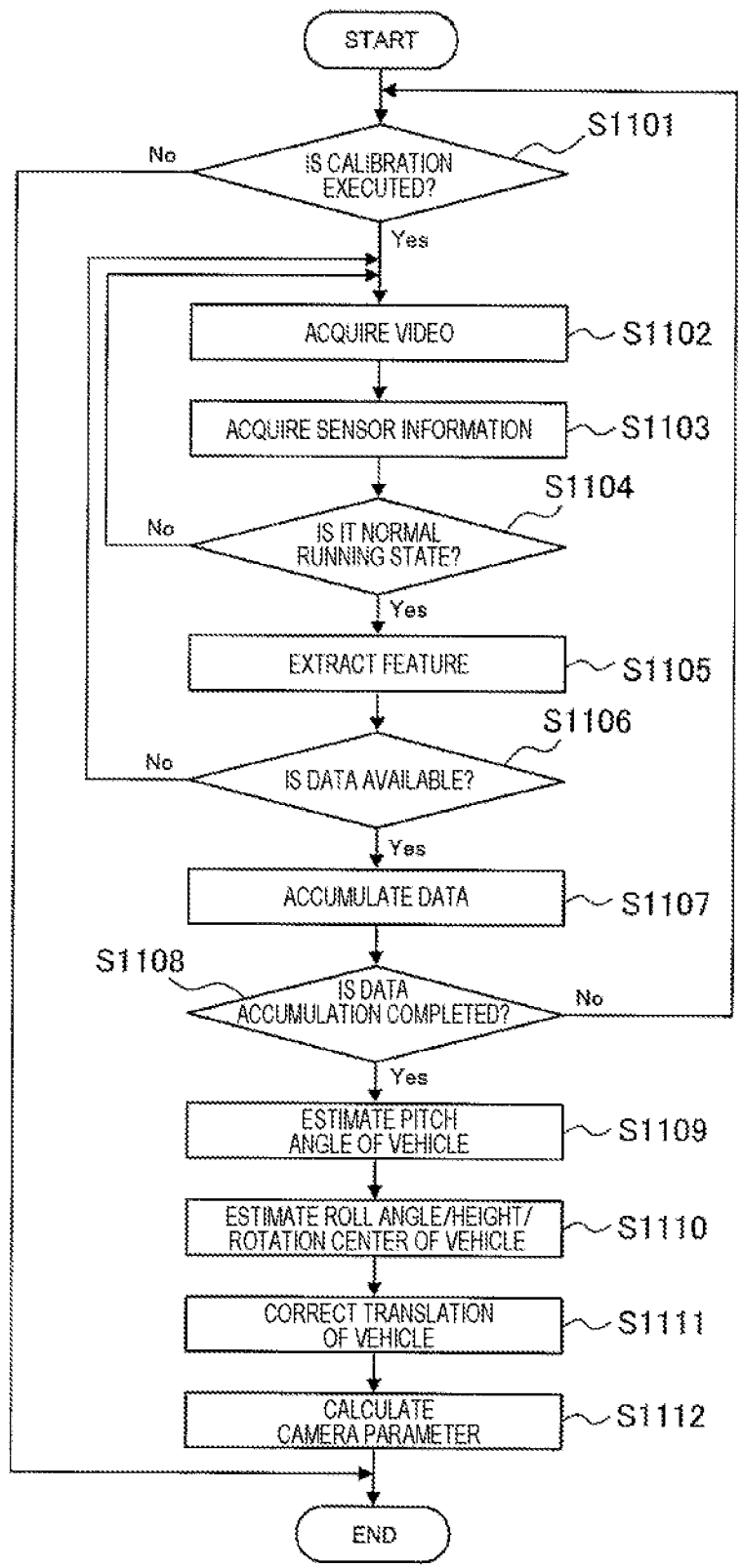
FIG. 11 is a flowchart for describing the calibration process of the camera calibration device illustrated in FIG. 10.

FIG. 8 is a diagram illustrating another example (second embodiment) of an inner configuration of the camera calibration device illustrated in FIG. 11. In addition, FIG. 9 is a flowchart for describing the calibration process of the camera calibration device illustrated in FIG. 8. A camera calibration device 116A illustrated in FIG. 8 is mainly different from the camera calibration device 116 illustrated in FIG. 6 in that a sensor information acquisition unit, a normal running determination unit, and a data availability determination unit are additionally provided, and other configurations are almost the same. Therefore, the description in the following will be made about only the configurations different from those of the camera calibration device 116 illustrated in FIG. 6. The same configurations as those of the camera calibration device 116 will be attached with the same symbols, and the detailed descriptions will be omitted.

The camera calibration device 116A illustrated in FIG. 8 mainly includes a calibration execution determination unit 201A, a video acquisition unit 202A, a feature extraction unit 203A, and a calibration unit 204A. Further, a sensor information acquisition unit 205A, a normal running state determination unit 206A, and a data availability determination unit 207A are also provided.

The calibration execution determination unit 201A determines whether there is a need to execute the calibration of the camera (S901 of FIG. 9). In a case where it is determined that there is a need to execute the calibration of the camera, the video acquisition unit 202A acquires the videos captured by four cameras 111 to 114 attached to the vehicle 1 from the RAM 102 (S902 of FIG. 9). Further, the sensor information acquisition unit 205A acquires the sensor information of various types of sensors such as the speed sensor 105, the steering sensor 106, and the yaw rate sensor 107 (S903 of FIG. 9). Herein, the sensor information is desirably acquired in synchronization with the video. Further, S902 and S903 illustrated in FIG. 9 may be executed at the same time, or S902 may be executed after S903.

The normal running state determination unit 206A determines whether the vehicle is in a normal running state (S904 of FIG. 9). Herein, the normal running state is a state in which there is no change in vehicle posture caused by accelerating/decelerating or turning, and the vehicle runs on the straight lane. A reason for determining that there is no change in the vehicle posture caused by accelerating/decelerating or turning and the vehicle runs on the straight lane is that the camera parameters of the video having different vehicle posture are different and not able to be simultaneously used as the feature quantity at the time of executing the calibration, and another reason is to eliminate a video of a scene from which information necessary for the calibration in running curve is not acquired since the linear feature quantity (for example, a white line, a curb stone, and a road end boundary including a broken line) in the longitudinal direction is used as the feature quantity to be used in the vehicle posture estimation. For example, no accelerating/decelerating in the case of no change in the vehicle posture caused by accelerating/decelerating or turning can be determined from that a certain speed continues for a constant time period on the basis of the information acquired from the speed sensor 105. For example, no change caused by turning can be determined from that an absolute value of the information acquired from the yaw rate sensor 107 is smaller than a predetermined threshold near to "0". In addition, in a case where a steering angle (information acquired from the steering sensor 106) at a speed equal to or more than a certain value is smaller than a predetermined threshold near to "0", it may be considered that the vehicle runs on a straight lane from a driver's operation situation.

In a case where the normal running state determination unit 206A determines that the vehicle is in the normal running state, the feature extraction unit 203A extracts a predetermined feature quantity to be used in the calibration from the videos captured by the cameras 111 to 114 (S905 of FIG. 9). On the other hand, in a case where it is determined that the vehicle is not in the normal running state, the videos captured by the cameras 111 to 114 are discarded because the videos are not possible to use in the calibration. A video of the next scene and the sensor information of various types of sensors are acquired.

The data availability determination unit 207A determines whether the parallel white lines (linear feature quantities) available in the calibration are captured in the videos captured by the cameras 111 to 114 (S906 of FIG. 9). Specifically, the data availability determination unit 207A recognizes the white lines (linear feature quantities) captured in the cameras 111 to 114 as images, and determines whether both conditions are satisfied (the feature quantity extracted by the feature extraction unit 203A is aligned in a straight line shape, and a difference between the video captured in the past and the white line is small). The determination on whether the feature quantity extracted by the feature extraction unit 203A is aligned can be made by measuring a linearity of the white line. For example, each edge point of the white line is fitted to be aligned in a straight line. In a case where a fitting error is equal to or less than a predetermined value, it may be considered that the white line is a straight line. In a case where the fitting error is larger than a predetermined value, it may be considered that the white line is not a straight line. In addition, the determination on whether a difference between the video captured in the past and the white line captured at the current time point is small can be made, for example, by calculating an angle of the white lines being paralleled similarly to the pitch angle estimation process of the vehicle. In a case where an angular error with respect to an average angle calculated in the past is equal to or less than a predetermined value, it may be considered that the difference is small. In a case where the angular error is larger than a predetermined value, it may be considered that the difference is large.

In a case where the data availability determination unit 207A determines that the data is available, the calibration unit 204A calculates the camera parameters of the cameras using the feature quantity obtained by the feature extraction unit 203A as described above so as to execute the calibration (S907 to S910 of FIG. 9). On the other hand, in a case where it is determined that the data is unavailable, the videos captured by the cameras 111 to 114 are discarded because the videos are not possible to use in the calibration. A video of the next scene and the sensor information of various types of sensors are acquired.

With such a configuration, the camera parameters of all the cameras can be more delicately and efficiently estimated only by the feature quantity in the longitudinal direction without necessitating the parallelism of the vehicle with respect to the feature quantity in the longitudinal direction (that is, a relative relation between the feature quantities in the longitudinal direction and the vehicle). With the use of the camera parameter, it is possible to generate the overview video with high accuracy in accordance with the loading state of the vehicle.

Third Embodiment of Camera Calibration Device

In addition, since the linear feature quantity captured at the same position is meaningless as data when the calibration at the time of usage described above is executed, the calibration is desirably executed after a plurality of linear feature quantities captured at different positions in the video are collected.

Figure 10:
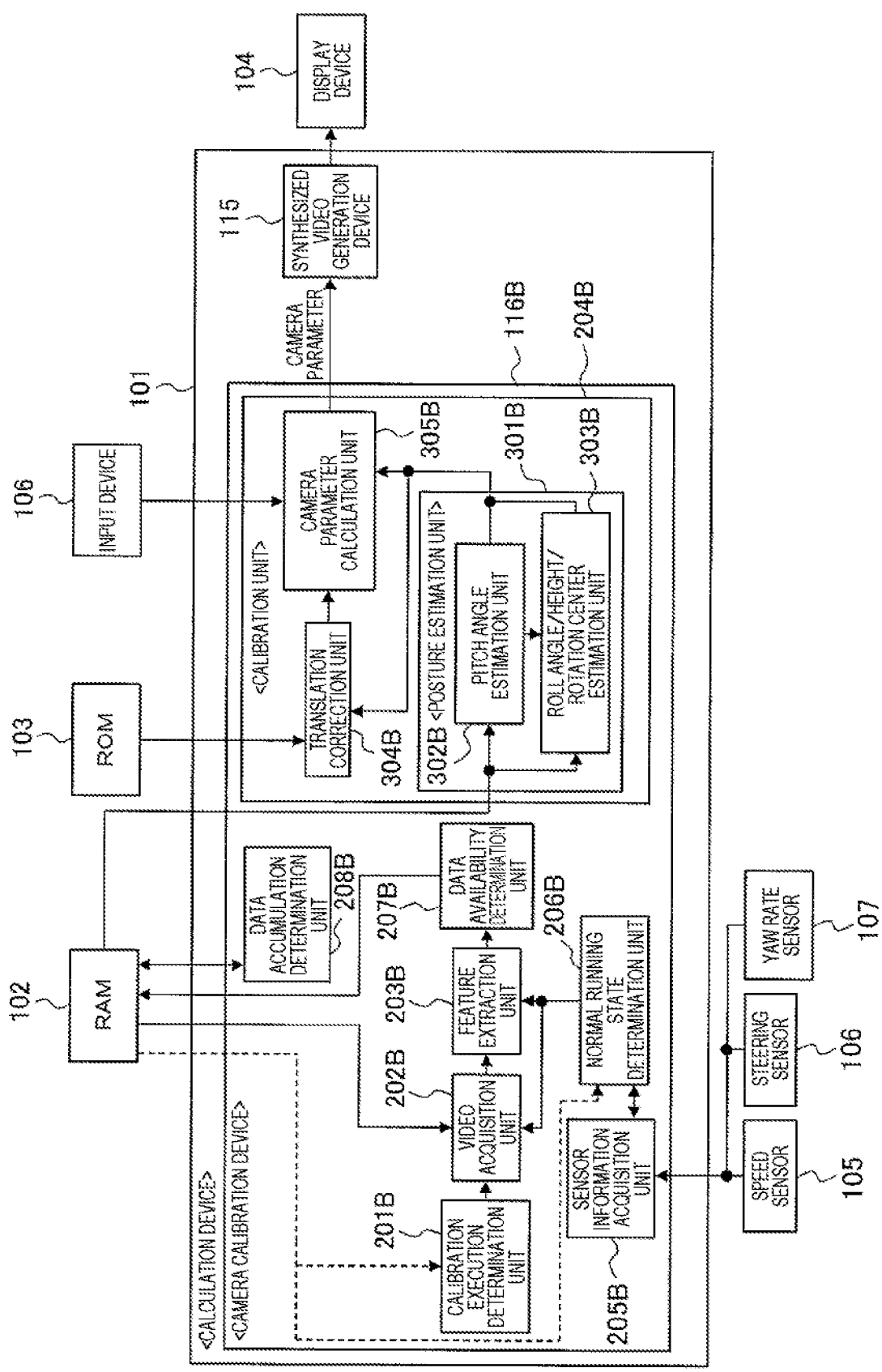
FIG. 10 is a diagram illustrating still another example of the inner configuration of the camera calibration device illustrated in FIG. 1.

FIG. 10 illustrates still another example (third embodiment) of an inner configuration of the camera calibration device illustrated in FIG. 1. In addition, FIG. 11 is a flowchart for describing the calibration process of the camera calibration device illustrated in FIG. 10. A camera calibration device 116B of the embodiment illustrated in FIG. 10 is different from the camera calibration device 116A illustrated FIG. 8 mainly in that a data accumulation determination unit is added, and other configurations are almost the same. Therefore, the description in the following will be made only about the configuration different from those of the camera calibration device 116A illustrated in FIG. 8. The same configurations as those of the camera calibration device 116A will be attached with the same symbols, and the detailed descriptions will be omitted.

The camera calibration device 116B illustrated in FIG. 10 mainly includes a calibration execution determination unit 201B, a video acquisition unit 202B, a feature extraction unit 203B, a calibration unit 204B, a sensor information acquisition unit 205B, a normal running state determination unit 206B, and a data availability determination unit 207B. Further, a data accumulation determination unit 208B is also provided.

The calibration execution determination unit 201B determines whether there is a need to execute the calibration of the camera (S1101 of FIG. 11). In a case where it is determined that there is a need to execute the calibration of the camera, the video acquisition unit 202B acquires the videos captured by four cameras 111 to 114 attached to the vehicle 1 from the RAM 102 (S1102 of FIG. 11), and the sensor information acquisition unit 205B acquires the sensor information of various types of sensors (S1103 of FIG. 11).

The normal running state determination unit 206B determines whether the vehicle is in the normal running state on the basis of the sensor information obtained by the sensor information acquisition unit 205B (S1104 of FIG. 11). In a case where it is determined that the vehicle is in the normal running state, the feature extraction unit 203B extracts a predetermined feature quantity to be used in the calibration from the videos captured by the cameras 111 to 114 (S1105 of FIG. 11). In addition, the data availability determination unit 207B determines whether the extracted data is available to the calibration on the basis of the data extracted by the feature extraction unit 203B (S1106 of FIG. 11). In a case where it is determined that the data is available, the extracted data is stored and accumulated in the RAM 102 serving as a data accumulation unit (S1107 of FIG. 11). For example, the feature extraction unit 203B stores a coefficient of an equation indicating a straight line obtained by the feature extraction unit 203B.

The data accumulation determination unit 208B determines whether an amount of data sufficient for the calibration is accumulated and the data accumulation is completed (S1108 of FIG. 11). The linear feature quantity (for example, a white line, a curb stone, and a road end boundary including a broken line) captured at the same position is meaningless as data for the cameras 111 to 114 attached to the vehicle 1. Therefore, there is a need to collect a plurality of linear feature quantities captured at different positions (for example, the front, rear, right, and left sides around the vehicle 1). For example, the data accumulation determination unit 208B sets in advance some areas for the cameras 111 to 114, determines whether the straight line data of the areas is obtained for the entire areas without blind spots, and determines whether the data is accumulated as much amount as necessary for the calibration.

In a case where it is determined that the data is accumulated by the data accumulation determination unit 208B as much amount as necessary for the calibration, the calibration unit 204B calculates the camera parameters of the cameras using the feature quantity accumulated in the RAM 102 serving as a data accumulation unit, and executes the calibration (S1109 to S1112 of FIG. 11).

With such a configuration, the camera parameters of all the cameras can be more delicately and efficiently estimated only by the feature quantity in the longitudinal direction without necessitating the parallelism of the vehicle with respect to the feature quantity in the longitudinal direction (that is, a relative relation between the feature quantity in the longitudinal direction and the vehicle). With the use of the camera parameter, it is possible to generate the overview video with high accuracy in accordance with the loading state of the vehicle.

In this way, according to this embodiment, the predetermined feature quantity extracted from the video (in particular, the vehicle posture) is estimated on the basis of the linear feature quantity, the position of the camera in the translation direction with respect to the ground surface is corrected on the basis of the information obtained from the calibration executed in the past (for example, at the time of product shipment), and the camera parameter related to the posture of the camera with respect to the ground surface is calculated on the basis of the posture of the vehicle and the position of the camera in the translation direction with respect to the ground surface. Therefore, the calibration can be executed even under a situation where the loading state of the vehicle is changed. Further, all the camera parameters are estimated without providing a restriction, for example, the parallelism of the vehicle with respect to the white line, so that the calibration can be executed. Accordingly, it is possible to generate the overview video with high accuracy according to the loading state of the vehicle under any situation.

Further, the invention is not limited to the above embodiments, and includes various modifications. For example, the above embodiments have been described in detail for easy understanding of the invention. The invention is not necessarily to be provided with all the configurations described above. In addition, some of the configurations of a certain embodiment may be replaced with the configurations of the other embodiments, and the configurations of the other embodiments may be added to the configurations of the subject embodiment. In addition, some of the configurations of the embodiments may be omitted, replaced, and added to other configurations.

In addition, the control lines and the information lines indicate something necessary for the description, and are not limited to those of all the control lines and the information lines necessary for a product. In practical, almost all the configurations may be considered to be connected to each other.

REFERENCE SIGNS LIST 1 vehicle
100 camera calibration system
101 calculation device
102 RAM (data accumulation unit)
103 ROM
104 display device
105 speed sensor
106 steering sensor
107 yaw rate sensor
108 input device
109 communication device
111 to 114 camera
115 synthesized video generation device
116 camera calibration device
201 calibration execution determination unit
202 video acquisition unit
203 feature extraction unit
204 calibration unit
205A sensor information acquisition unit
206A normal running state determination unit
207A data availability determination unit
208B data accumulation determination unit
301 posture estimation unit
302 pitch angle estimation unit
303 roll angle/height/rotation center estimation unit
304 translation estimation unit
305 camera parameter calculation unit

The invention claimed is:

1. A camera calibration device that is mounted in a vehicle and executes calibration at a time of usage on a plurality of cameras attached around the vehicle and capturing an ambient environment of the vehicle, comprising:
a processor configured to:
acquire a video captured by a camera of the plurality of cameras;
extract a predetermined feature quantity from the video;
estimate a vehicle posture of the vehicle on the basis of the predetermined feature quantity;
correct a position in a translation direction of the camera with respect to a ground surface; and
calculate a camera parameter related to a camera posture of the camera with respect to the ground surface based on the vehicle posture of the vehicle and a position of the camera in the translation direction with respect to the ground surface, and
wherein the calibration at the time of usage further comprising the processor configured to:
select a reference camera from the plurality of cameras attached around the vehicle; and
correct a position of each camera of the plurality of cameras in the translation direction with respect to the ground surface based on a position of the selected reference camera in the translation direction with respect to the ground surface and the vehicle posture of the vehicle, wherein the position of the selected reference camera is obtained from a past calibration executed in the past and stored in a memory in the vehicle,
wherein estimating the vehicle posture during the calibration at the time of usage further comprising the processor configured to:
estimate a pitch angle of the vehicle on the basis of the predetermined feature quantity; and
estimate a roll angle, a height, and a rotation center of the vehicle on the basis of the predetermined feature quantity, and
wherein the processor is further configured to:
extract a linear feature quantity having a straight line shape from the video, and
estimate the vehicle posture of the vehicle on the basis of a parallelism of linear feature quantities in parallel to each other in the vicinity of the vehicle in the video and a deviation amount in a boundary between the videos captured by the cameras in a synthesized video generated from the videos.

2. The camera calibration device according to claim 1, wherein the processor is further configured to determine whether the calibration is executed.

3. The camera calibration device according to claim 2, wherein the processor is further configured to:
determine whether the calibration is executed on the basis of the parallelism of linear feature quantities in parallel to each other in the vicinity of the vehicle in the video and the deviation amount in a boundary of the videos captured by the cameras in a synthesis video generated from the videos.

4. The camera calibration device according to claim 1, wherein the processor is further configured to determine whether the vehicle is in a normal running state on the basis of at least one selected from a speed, a steering angle, and a yaw rate of the vehicle.

5. The camera calibration device according to claim 1, wherein the processor is further configured to determine whether a feature quantity available in the calibration is shown in the video.

6. The camera calibration device according to claim 5, wherein the processor is further configured to determine whether a feature quantity available in the calibration is shown in the video on the basis of a linear feature quantity of a straight line shape extracted from the video.

7. The camera calibration device according to claim 1, further comprising a data accumulation storage that accumulates the predetermined feature quantity, and wherein the processor is further configured to determine whether the data accumulation in the data accumulation unit storage is completed.

8. The camera calibration device according to claim 7, wherein the processor is further configured to:
determine whether the data accumulation is completed on the basis of a position where the linear feature quantity is shown in the video.

9. The camera calibration device according to claim 7, wherein the processor is further configured to estimate the vehicle posture of the vehicle on the basis of the predetermined feature quantity accumulated in the data accumulation storage.

10. A camera calibration system comprising:
the camera calibration device according to claim 1;
the plurality of cameras that are mounted in the vehicle such that the captured videos are partially overlapped or adjacent;

a synthesized video generation device comprising a processor configured to correct the videos captured by the plurality of cameras using camera parameters of the cameras obtained from the camera calibration device so as to generate a synthesized video; and
a display device that displays the synthesized video.

* * * * *